United States Patent [19]
Nishii et al.

[11] Patent Number: 5,918,045
[45] Date of Patent: Jun. 29, 1999

[54] DATA PROCESSOR AND DATA PROCESSING SYSTEM

[75] Inventors: Osamu Nishii, Inagi; Sadaki Nakano, Kunitachi; Norio Nakagawa, Tokyo; Takanobu Tsunoda, Kokubunji, all of Japan

[73] Assignee: Hitachi, Ltd., Tokyo, Japan

[21] Appl. No.: 08/953,387

[22] Filed: Oct. 17, 1997

[30] Foreign Application Priority Data

Oct. 18, 1996 [JP] Japan ................................. 8-275675

[51] Int. Cl.⁶ ............................................. G06F 9/38
[52] U.S. Cl. ................................... 395/584; 711/213
[58] Field of Search ........................... 395/381, 383, 395/584; 711/213

[56] References Cited

U.S. PATENT DOCUMENTS

| | | | |
|---|---|---|---|
| 5,367,703 | 11/1994 | Levitan | 395/800.23 |
| 5,463,737 | 10/1995 | Saitoh | 711/169 |
| 5,579,493 | 11/1996 | Kiuchi et al. | 395/383 |
| 5,784,604 | 7/1998 | Muhich et al. | 395/585 |

FOREIGN PATENT DOCUMENTS

| | | |
|---|---|---|
| 62-6328 | 1/1987 | Japan . |
| 1-239639 | 9/1989 | Japan . |
| 2-275532 | 9/1990 | Japan . |
| 7-239781 | 9/1995 | Japan . |
| 7-306785 | 11/1995 | Japan . |

OTHER PUBLICATIONS

"PA–RISC 1.1 Architecture and Instruction Set", Nov. 1990. pp. –2–8 –C–5.

*Primary Examiner*—William M. Treat
*Attorney, Agent, or Firm*—Antonelli, Terry, Stout & Kraus, LLP

[57] ABSTRACT

The data processor includes a CPU and an instruction prefetch buffer that prefetches an instruction executed by the CPU and stores it therein. The CPU contains a detection circuit for detecting whether or not a displacement from a branch instruction to a branch target instruction is a specific displacement on the basis of branch displacement information that the concerned branch instruction holds. The instruction prefetch buffer clears an instruction already prefetched when the detection circuit detects that the displacement is not the specific displacement and outputs a branch target instruction newly fetched to the CPU, and outputs a branch target instruction already prefetched to the CPU when the detection circuit detects that the displacement is the specific displacement. Thus, the date processor fetches a branch target instruction within a certain range from the instruction prefetch buffer at a high speed without adding the nullifying bit on the instruction code.

12 Claims, 8 Drawing Sheets

TO BUS CONTROLLER

FIG. 5A

```
    ⋮
100 INSTRUCTION
102 BRANCH INSTRUCTION
    (BRANCH INTO ADDRESS 106)
104 INSTRUCTION
106 INSTRUCTION
    ⋮
```

FIG. 5B

| | 0 | 1 | 2 | 3 | 4 | 5 | 6 | 7 | 8 | 9 | 10 TIME |
|---|---|---|---|---|---|---|---|---|---|---|---|
| INSTRUCTION BEING EXECUTED BY INSTRUCTION EXECUTION UNIT | FC | FE | 100 | 102 | | | 106 | 108 | 10A | 10C | 10E |
| 143 | -- | 108 | -- | -- | -- | 10C | 110 | 114 | -- | 118 | |
| 122 | 104 | -- | 10B | -- | -- | -- | 10C | 110 | 114 | -- | |
| | 106 | -- | 10A | -- | -- | -- | 10E | 112 | 116 | -- | |
| DATA OF INSTRUCTION PREFETCH BUFFER 501 | FE | 100 | 102 | 104 | 104 | 10B | 10A | 10C | 10E | 110 | |
| 502 | 100 | 102 | 104 | 106 | 106 | 10A | -- | 10E | 110 | 112 | |
| 503 | 102 | 104 | 106 | 108 | 108 | -- | -- | -- | 112 | 114 | |
| 504 | -- | 106 | -- | 10A | 10A | -- | -- | -- | -- | 116 | |

FIG. 6

```
cmp/gt r1, r2    ; set T-bit if r1 > r2
bt label         ; branch to label if T-bit set
add #4, r3       ; r3 + 4 → r3
label : next inst
```

DATA PROCESSOR AND DATA PROCESSING SYSTEM

BACKGROUND OF THE INVENTION

The present invention relates to a technique for fetching a branch target instruction in a data processor which is capable of prefetching an instruction, particularly to a technique that is effective in use, for example, for increasing the speed of executing a conditional instruction (instruction executed only when a specific condition is satisfied).

The use of an instruction prefetch technique employing an instruction prefetch buffer and the like will increase the speed of prefetching of an instruction to an instruction register. However, a change in the order of program execution will deprive an instruction, which has been prefetched with great effort, of an opportunity to be executed. The Japanese Patent Application Laid Open No. 7-239781 discloses a technique that judges whether a branch target instruction is stored in an instruction prefetch buffer or not, and which, if it is stored, utilizes the date stored in the instruction prefetch buffer. This technique intends to effectively utilize an instruction once prefetched, even when the instruction execution order of a CPU is changed by a branch target instruction. In addition to this, there are similar techniques disclosed in Japanese Patent Application Laid Open No. 1-239639, No. 2-275532, No. 7-306785, and No. 62-6328.

SUMMARY OF THE INVENTION

The inventors of the present invention have examined ways to improve the function of executing a conditional instruction by means of a data processor. For example, they have examined ways to increase the speed of executing a conditional instruction, which is achieved by a procedure wherein, whether or not the magnitude of two register values is true is judged by a comparison instruction, and if the foregoing judgment is true, the conditional branch instruction skips the following addition instruction to branch the next or target branch instruction, and if it is false, executes the foregoing addition instruction. In such a branch instruction technique using one-instruction skipping, it is necessary to clear an instruction prefetch buffer and fetch a branch target instruction, which will require a delay time before the branch target instruction can be executed. However, if the branch target instruction is already stored in the instruction prefetch buffer, it will be advantageous to utilize the branch target instruction. On the other hand, if time is required to judge whether or not the branch target instruction is stored in the instruction prefetch buffer, it is clear that the utilization of the branch target instruction will not be effective at all for increasing the processing speed, because there frequently occurs such a processing, such as the execution of the foregoing conditional one instruction.

Further, there is an instruction wherein the execution of the foregoing conditional instruction is taken into consideration. Namely, in PA-RISC 1.1 Architecture and Instruction Set Reference Manual (October 1990) 2.8–2.9, on page A9, C1–C5, there is mentioned a technique wherein an arithmetic instruction or a branch instruction possesses one nullifying bit in the instruction, and an instruction in which the nullifying bit is in the set state invalidates the next instruction. The value of this nullifying bit can selectively cause the subsequent instruction to be skipped, which produces the same effect as a branch to two instructions ahead. However, this technique uses one bit of the instruction code for the nullifying bit. In a short instruction, such as 32 bits or less (16, 24 bits, etc.) in instruction length, adopting the nullifying bit will restrict the available functions of the instructions (number of bits of instruction code, or kinds of instruction code). This has been found to be unrealistic in practice.

It is therefore an object of the present invention to provide a data processor that can supply a branch target instruction within a certain range or of a specific displacement by a branch instruction at a high speed to a CPU from an instruction prefetch buffer without adding a special bit, such as a nullifying bit, in the instruction.

The typical aspects of the invention will hereafter be described.

The data processor according to one aspect of the invention refers to the branch displacement information contained in the branch instruction itself when the instruction order is changed, and detects whether or not the branch target is within a certain range (specific branch displacement) from the branch instruction. If it is within a certain range, the data processor is designed to not clear the instruction prefetch buffer, but to use the branch target instruction already prefetched in the instruction prefetch buffer. According to this construction, the detection as to whether the branch target is within a certain range or not can be obtained before completing calculation of the branch target address, since the branch displacement information is used for calculating the branch target address at the execution stage by the concerned branch instruction. When the detection result is inside the range, the instruction prefetch buffer is not cleared; and when it is outside the range, the instruction prefetch buffer is cleared. Therefore, the instruction prefetch buffer can acquire a control to be cleared or not cleared, before the branch target address is produced or before the branch target memory address is supplied. Thereby, the instruction prefetch buffer can immediately output the branch target instruction out of instructions already prefetched, when the detection result is within the range. And, when the detection result is outside the range, upon receiving the branch target instruction address, the instruction prefetch buffer can immediately fetch the instruction from outside and output it to the instruction register.

According to a further detailed aspect of the invention, the data processor includes a CPU and an instruction prefetch buffer that prefetches an instruction to be executed by the CPU and stores it therein. The CPU contains detection means for detecting whether or not a displacement from a branch instruction to a branch target instruction indicates a specific value on the basis of information (branch displacement information) that the concerned branch instruction holds. The instruction prefetch buffer clears an instruction already prefetched when the detection means detects that the displacement does not indicate the specific value and outputs a branch target instruction newly fetched to the CPU and outputs the branch target instruction already prefetched to the CPU when the detection means detects that the displacement indicates the specific value.

The branch instruction mentioned herein can also be referred to as a program counter-relative branch instruction. According to another aspect in regard to a program counter-relative branch instruction, the data processor includes a CPU, prefetch control means that controls the prefetching of an instruction to be executed by the CPU, and a buffer memory for storing a prefetched instruction. The CPU contains a program counter, instruction decode means for decoding an instruction fetched from the instruction prefetch buffer on the basis of a value of the program counter, detection means for detecting whether or not a decoded result produced by the instruction decode means indicates a program counter-relative branch instruction and whether or not a value indicated by branch displacement information contained in a branch instruction is a specific value, and an address calculation means for calculating a branch target address on the basis of the branch displacement information. The prefetch control means clears an instruction already prefetched in the buffer memory when the detection means detects that an instruction is other than a program counter-relative branch instruction, or when the branch displacement information does not indicate a specific value, and newly fetches a branch target instruction on the basis of an instruction address calculated by the address calculation means and outputs it to the CPU. On the other hand, the prefetch control means selects the branch target instruction corresponding to the instruction address produced by the address operation means out of instructions already prefetched in the buffer memory and outputs it to the CPU when the detection means detects that the decoded result produced by the instruction decode means is a program counter-relative branch instruction and that the branch displacement information indicates a specific value.

With use of the foregoing prefetch control means, it is possible to realize one-instruction skipping that uses a conditional branch without clearing the instruction prefetch buffer. This is functionally the same as one-instruction skipping that uses a nullifying bit of an instruction code. However, it does not take up a specific bit for the nullifying operation, which substantially restricts the available functions of the instructions. Therefore, in a date processor haying an architecture formed of a small number of instruction bits, such as a 16-bit fixed length, the speed of executing conditional instructions using a branch instruction can be increased without restricting the function or the type of instructions.

To form the instruction prefetch buffer using a FIFO buffer capable of selecting a through path will further increase the speed of outputting the branch target instruction fetched as the very first instruction after the FIFO buffer is cleared.

The data processor may further comprise an instruction cache memory from the view point of increasing the speed of fetching instructions, and the FIFO buffer can fetch instructions from the instruction cache memory. When the data processor is formed into one semiconductor chip, it may further comprise a bus controller, which controls the start of an external bus cycle, whereby the instruction cache memory takes in a cache entry from the outside of the semiconductor chip. Further, a data processing system in which the data processor is applied is provided with an external memory that the data processor accesses through the bus controller, and an external input-output circuit that the data processor accesses through the bus controller. Thereby, instructions stored in the external memory, etc. can be executed at a high speed.

The foregoing and other objects and novel features of the invention will become apparent from the specification and accompanying drawings.

BRIEF DESCRIPTION OF THE DRAWINGS

In the drawings:

FIG. 5A is a chart for explaining what kind of instructions are located at respective addresses, when the branch by a program counter-relative branch instruction involves one-instruction skipping;

FIG. 5B is one example of an operational timing chart, when the branch by a program counter-relative branch instruction is one-instruction skipping;

FIG. 6 is a chart for explaining one example of an instruction description when a conditional instruction is executed;

DESCRIPTION OF THE PREFERRED EMBODIMENT

Preferred embodiments of the present invention will be described with reference to the accompanying drawings.

Figure 1:
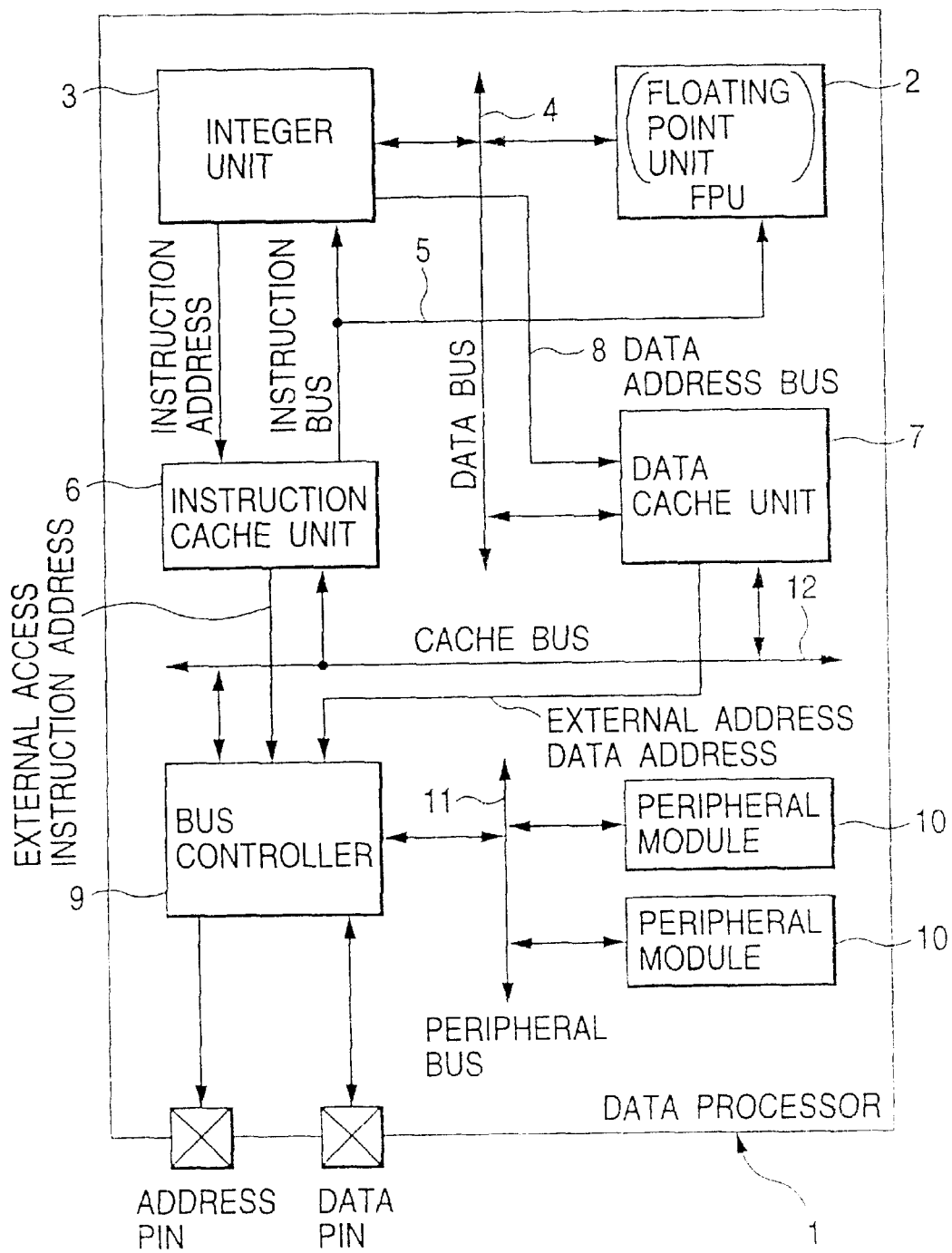
FIG. 1 is a block diagram showing one example of a data processor relating to the present invention.

FIG. 1 is a block diagram showing one example of a data processor relating to the present invention. The data processor 1 shown in FIG. 1 has a 32-bit RISC (Reduced Instruction Set Computer) architecture, and the instruction set consists of a 16-bit fixed length.

This data processor 1 has a floating point unit 2. Further, the data processor 1 has an integer unit 3. The integer unit 3 is connected to the floating point unit 2 through a 32-bit data bus 4. The integer unit 3 and floating point unit 2 fetch instructions from an instruction cache unit 6 through an instruction bus 5. Instruction addresses are given to the instruction cache unit 6 from the integer unit 3. A data cache unit 7 is connected to the data bus 4 and is supplied with data addresses from the integer unit 3 through a data address bus 8. The data cache unit 7 and the instruction cache unit 6 are provided with a cache controller and a cache memory, respectively, which are not illustrated. The instruction cache unit 6 and the data cache unit 7 are connected to a bus controller 9 through a cache bus 12 carrying data signals and control signals. The instruction addresses for external access resulting from a cache miss in the instruction cache unit 6 and the like are supplied to the bus controller 9. The data addresses for external access resulting from a cache miss, etc., in the data cache unit 7 are also supplied to the bus controller 9. In accordance with the instruction addresses and the data addresses, the bus controller 9 starts an external bus cycle for accessing external memories, etc., coupled to address pins and data pins typically illustrated. Further, the bus controller 9 is connected to peripheral circuits 10, such as a timer and a serial communication interface controller, through a peripheral bus 11. The data processor shown in FIG. 1 is formed into one semiconductor chip, such as a monolithic silicon chip.

The floating point unit 2 (hereunder, also referred to as simply FPU) requests data or instructions from the memory for processing floating points. In this embodiment, the FPU 2 does not have a memory addressing capability for storing data in the cache memory of the date cache unit 7 and for fetching data from the concerned cache memory. This is to save a chip area by removing the necessity of providing a memory addressing circuit in the FPU 2. On the other hand, the integer unit 3 has the capability of addressing the cache memory, etc., for the FPU 2. Accordingly, the FPU 2 and the floating point instruction are not needed to support such a powerful addressing function as that of the integer unit 3, and the integer unit 3 bears all of the functions. The integer unit 3 not only fetches data from the memory for the FPU 2, but also fetches all the instructions, including the floating point instructions, from the memory for the FPU 2. The instructions are taken in by both of the integer unit 3 and the FPU 2 to be decoded. When the decoded instruction is a CPU instruction, the integer unit 3 executes the integer processing thereby designated. Further, when the decoded instruction is a FPU instruction, the integer unit 3 executes addressings and other processings instead of the FPU 2. When the decoded instruction is a FPU instruction, the FPU 2 executes the floating point processing thereby designated. Further, when the decoded instruction is a CPU instruction, the FPU 2 ignores the instruction.

Figure 2:
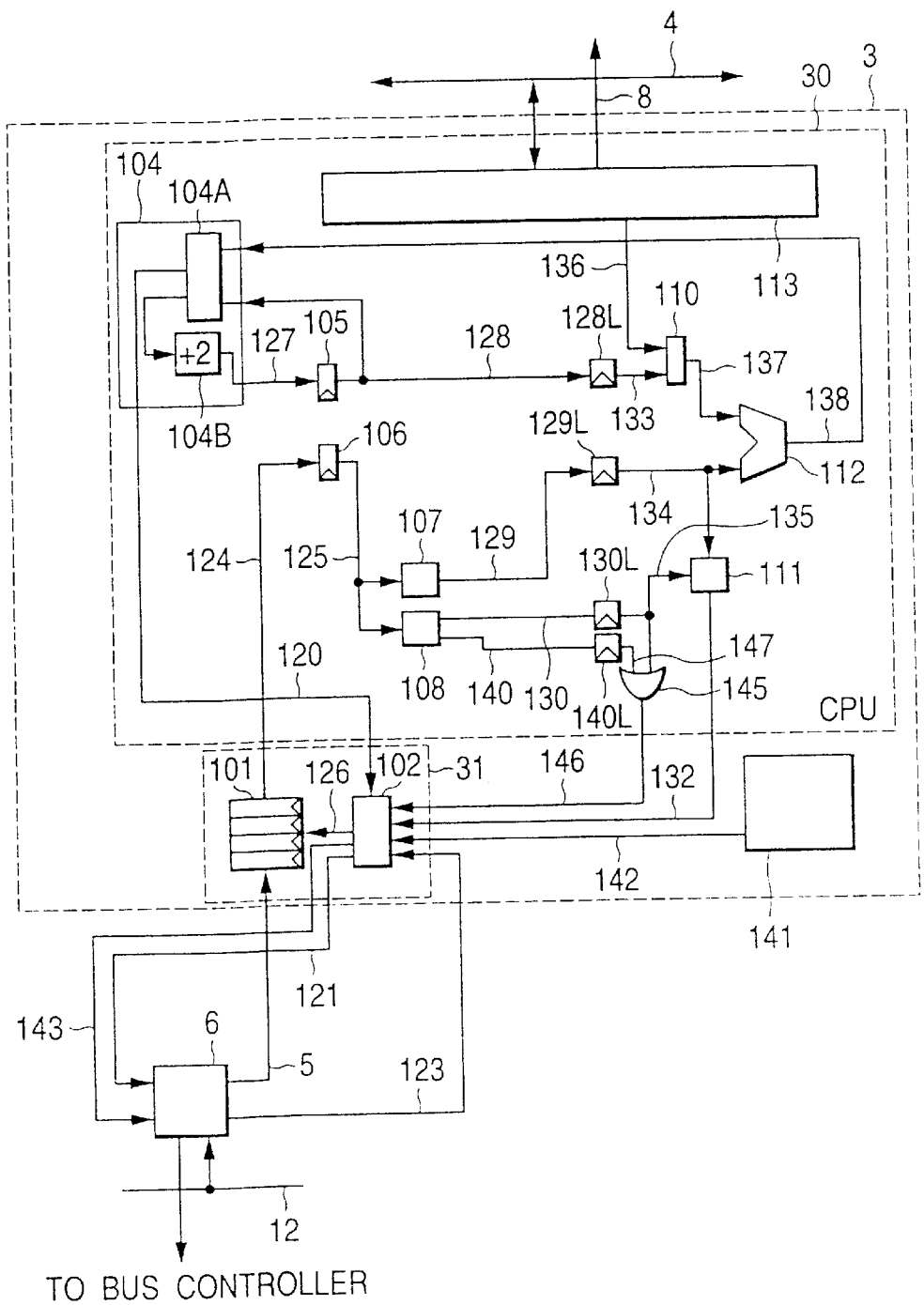
FIG. 2 is a schematic diagram showing one example of an integer unit in which a construction for the instruction fetch and instruction prefetch in the data processor in FIG. 1 is mainly illustrated.

FIG. 2 illustrates one example of the foregoing integer unit 3. The integer unit 3 contains a central processing unit (CPU) 30 and an instruction prefetch buffer 31. FIG. 2 shows a detailed control system for fetching instructions in regard to the invention. The instruction fetched by an instruction register 106 from the instruction prefetch buffer 31 is decoded by an instruction decoder 108. An operation unit 113 includes a general register and an arithmetic and logic execution unit, etc., (not illustrated), for operating in accordance with the result decoded by the instruction decoder 108, and which executes the integer operation of data and the address calculation of data, etc.

The reference symbol 105 in FIG. 2 indicates a program counter. Although the invention is not specially limited, the address signal processed by the CPU 30 is provided as a byte address, and one instruction consists of 16 bits (2 bytes). Although the invention is not specially limited, the date processor has a superscalar RISC architecture. However, the instruction register 106 will be explained on the premise that it fetches instructions one by one in order to make the understanding of the invention easier. The program counter 105 holds an address to be executed next. A program counter control logic circuit 104 selects the output of the program counter 105 or a branch address 138 described later in detail by means of a selector 104A, and outputs the selected data as an instruction address 120. And, a +2 adder 104B generates a next instruction address of an instruction to be fetched next, which is supplied to the foregoing program counter 105. As represented in the execution of the branch instruction, the foregoing selector 104A selects the branch address 138 when the execution order of instructions changes.

The instruction address selected by the selector 104A is supplied to the instruction prefetch buffer 31. The instruction prefetch buffer 31 prefetches an instruction on the basis of the instruction address. The prefetched instruction is supplied to the instruction register 106 in synchronism with the timing of fetching the instruction.

The foregoing instruction decoder 108 decodes the instruction supplied by the instruction register 106 and controls the components inside of the integer unit 3. FIG. 2 shows only a signal 130 indicating a program counter-relative branch and a decoded signal 140 of the other branch instructions, as representative examples of the decoded signals outputted by the instruction decoder 108.

A program counter-relative branch instruction is a branch instruction having a program counter-relative addressing mode, and it has a field for displacement. Given that this displacement is designated disp., and the value of the program counter is PC, the branch target address is PC+2× disp. The displacement here represents a branch displacement information for determining an address displacement to the branch target. The addressing mode employing a displacement as branch displacement information includes other types of addressing modes, such as the register indirect and base register indirect. In the configuration in FIG. 2, a branch displacement decoder 107 decodes instructions and extracts the foregoing displacement in the various addressing modes to generate a branch displacement signal 129.

An adder 112 adds the foregoing branch displacement signal 129 through a latch 129L to a branch base signal 137. The added result is the previously-mentioned branch address 138. The branch base signal 137 differs depending on the addressing mode of the branch instruction. In case of the addressing mode of the foregoing program counter-relative branch, an instruction address 128 to be executed is selected through a latch 128 L by a selector 110 to serve as the branch base signal 137. In case of the addressing mode of a register indirect branch, a value 136 of a specific register (not illustrated) contained in the operation unit is selected by the selector 110 to serve as the branch base signal 137. The selector 110 is controlled in accordance with the decoded result of the operation code by the instruction decoder 108.

A signal 135 indicating the foregoing program counter-relative branch and a decoded signal 147 (the signal 140 passed through a latch 140L) of the other branch instructions are supplied to a logical sum gate 145, and an output signal 146 therefrom serves as an instructing signal to clear the instruction prefetch buffer 31.

Here, a branch displacement signal 134 (the branch displacement signal 129 which has passed through the latch 129L) and the signal 135 indicating the program counter-relative branch (the signal 130 indicating the program counter-relative branch which has passed through a latch 130L) are supplied to an invalidation blocking determination logic unit 111 (hereunder, also referred to as simply determination logic unit) for the instruction prefetch buffer. This determination logic unit 111 produces an invalidation blocking signal (clearance blocking signal) 132 for the instruction prefetch buffer based on these input signals. In this case, the clearance blocking signal 132 instructs invalidation block when the signal 130 indicating the program counter-relative branch is in an Enable status and the displacement indicated by the branch displacement signal 129 is 2 (the displacement of the branch address as the byte address is 4). That is, when the branch by the pro-tram counter-relative branch instruction involves one-instruction skipping, the clearance blocking signal 132 is brought into an Enable status to block or prevent clearing of the prefetch buffer.

Figure 3:
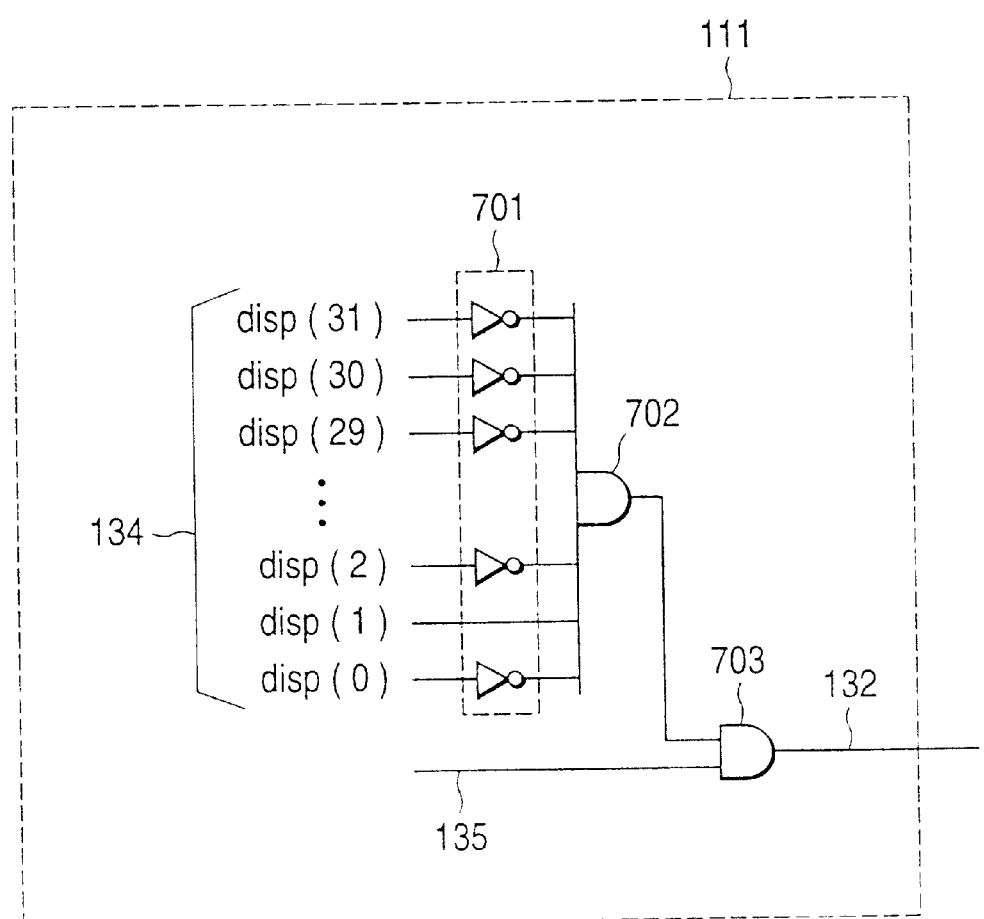
FIG. 3 is a circuit diagram showing one example of a determination logic unit for blocking to clear an instruction prefetch buffer.

FIG. 3 illustrates one example of the foregoing determination logic unit 111. The foregoing branch displacement signal 134 is illustrated in disp (31)–disp (0). An inverter unit 701 and AND gate 702 output the logical value "1" when detecting disp (31)–disp (0)=00 . . . 00010, namely, when the displacement in the program counter-relative branch instruction =2. In FIG. 3, an AND gate 703 takes a logical product of the output of the foregoing AND gate 702 and the signal 135 indicating the foregoing program counter-relative branch, and the logical product signal serves as the clearance blocking signal 132. In this case, the clearance blocking signal 132 operates to invalidate clearing of the instruction prefetch buffer 31 by the logical value "1".

The instruction prefetch buffer 31 is designed to prefetch instructions and store them therein, and is comprised of a prefetch controller 102 to control prefetching of instructions to be executed by the CPU 30 and a buffer memory 101 to store the prefetched instructions therein.

Here, in order to easily understand the control of the instruction prefetch buffer 31, the pipeline control of the data processor 1 will be described first. Although the invention is not specially limited, the pipeline operation of the CPU is comprised of an instruction fetch stage, a decode stage, an execution stage, a memory access stage, and a write-back stage. At the write-back stage, the operation result is written back to a register. The flow control at each execution stage in the pipeline is performed by a timing controller 141 representatively illustrated. The timing controller 141 receives a part of the decoded signals at the decode stage and executes the flow control among instructions. The flow control includes handling data conflicts, pipeline installation for acquiring a determination condition, and the control of bypasses, etc. A signal 142 for instructing the fetching of an instruction to the instruction register 106 is supplied, although the invention is not specially limited, to the instruction prefetch buffer 31 as a part of the flow control by the timing controller 141. The timing controller 141 controls the transfer of signals from the instruction fetch stage to the instruction decode stage by the latch operation of the foregoing program counter 105 and the instruction register 106 representatively illustrated. The timing controller 141 also controls the transfer of signals from the instruction decode stage to the instruction execution stage by the latch operation of the latch units 128L, 129L, 130L, and 140L representatively illustrated.

Figure 4:
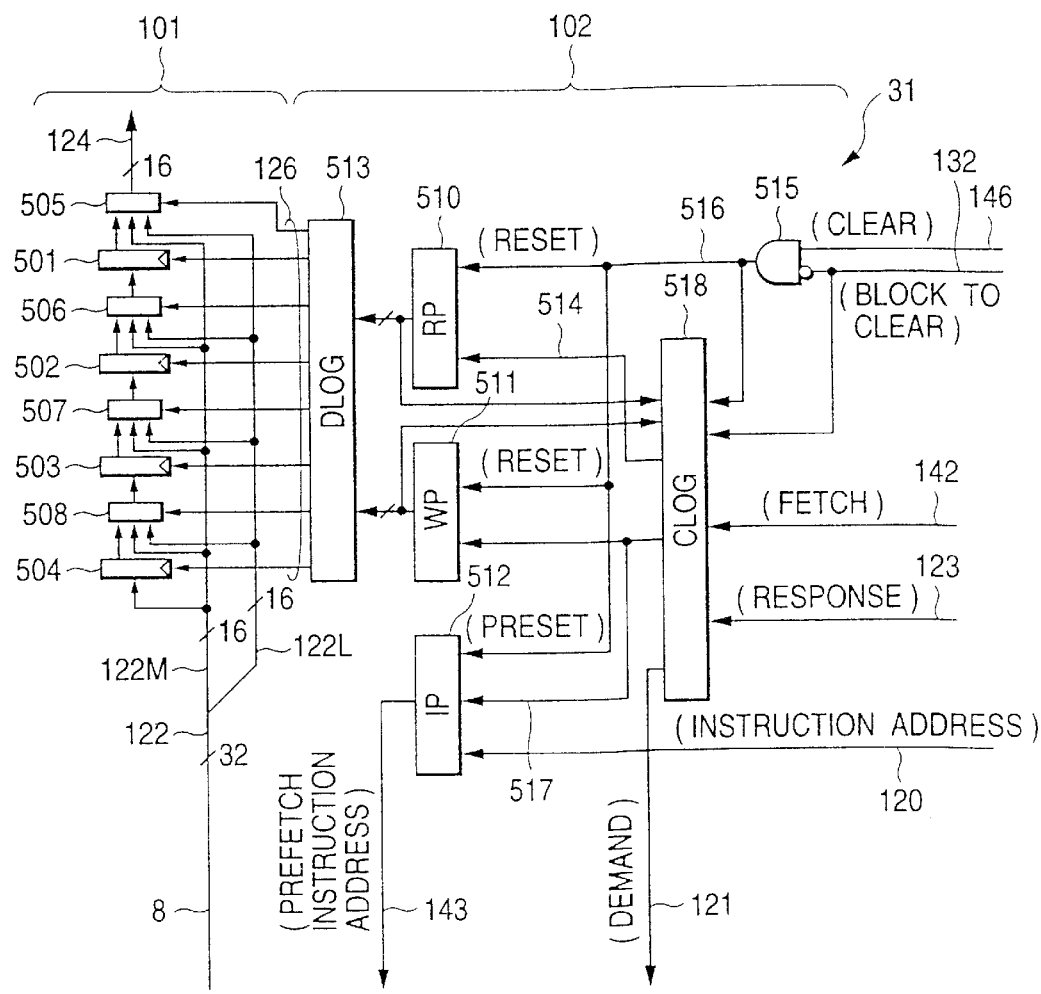
FIG. 4 is a circuit diagram showing one example of an instruction prefetch buffer.

FIG. 4 illustrates one example of the instruction prefetch buffer 31. The buffer memory 101 is, for example, a FIFO (First In-First Out) buffer having storage areas for four stages. In FIG. 4, the buffer memory 101 is provided with 4-stage serial latch units 501–504, each of which consists of 16 bits. The cache bus 12 carries 32 bits, and the cache memory unit 6 supplies two instructions (32 bits) simultaneously. Selectors 505–508 each are disposed at the subsequent stages of the foregoing latch units 501–504, respectively. Each of the selectors 505–508 selects one of the previous stage outputs of each of the latch units 501–504, the lower 16 bit bus 122L of the cache bus 12, and the upper 16 bit bus 122M, and supplies the selected one to the data input of the latch unit at the subsequent stage. The input of the first stage latch unit 504 is connected to the upper 16-bit bus 122M. The lower 16 bit bus 122L and upper 16-bit bus 122M of the foregoing cache bus 12 are also connected to the input of the final stage selector 505, whereby a through path is created and the instructions outputted by the cache memory unit 6 can be directly outputted.

The prefetch controller 102 comprises a 2-bit read pointer (RP) 510 to the FIFO buffer 101 and a 2-bit write pointer (WP) 511. When the FIFO buffer 101 is empty, both of the pointers 510, 511 indicate the initial values. Each time it is written to, the write pointer 511 receives an increment; each time it is read, the read pointer 510 receives an increment; and the read pointer 510 operates so as to run after the write pointer 511. In the state in which the read pointer 510 catches up with the write pointer 511, the FIFO buffer 101 is empty. In the state in which the write pointer 511 catches up with the read pointer 510, the FIFO buffer 101 is full. A decode logic (DLOG) 513 that receives the output enumerated by the read pointer 510 and write pointer 511 controls data from the foregoing latch units 501–504 and selectors 505–508 in accordance with the first-in first-out rule. Specially, directly after the FIFO buffer 101 is initialized or cleared, the decode logic 513 operates to output instructions through the previously-mentioned through path.

Further, the prefetch controller 102 comprises a prefetch pointer (IP) 512 that stores an instruction address to be next prefetched into the FIFO buffer 101. An access address 143 given to the cache memory unit 6 is the instruction address held by the foregoing prefetch pointer 512. A signal 121 is an instruction fetch request signal transmitted to the cache memory unit 6. A signal 123 is an acknowledge signal to the instruction fetch request. When the instruction cache unit 6 executes a cache fill operation due to a cache miss, the foregoing acknowledge signal 123 is not in an Enable status before a new cache entry is taken in from the external memory.

An initializing signal 516 for the pointers 510–512 is outputted from an AND gate 515 that makes a logical product of the instructing signal 146 to clear the instruction prefetch buffer and the inverted signal of the clearance blocking signal 132. The initializing signal 516 is the reset signal of an enumerated value as to the read pointer 510 and the write pointer-511, and it is a preset signal as to the prefetch pointer 512. The preset data is the instruction address 120 at that moment. As clearly seen from the foregoing description, the initializing signal 516 is put into an Enable status except for a case in which the branch by the program counter-relative branch instruction involves one-instruction skipping, when the instruction execution order is changed due to branch instructions and the like.

A control logic unit (CLOG) 518 controls the pointers 510–512 and controls access to the cache memory unit 6. The control logic unit 518 receives the initializing signal 516, clearance blocking signal 132, request signal 142 for fetching instructions from the timing controller 141, acknowledge signal 123 from the cache memory unit 6, and enumerated values by the read pointer 510 and the write pointer 511. The control logic unit 518 receives enumerated values provided by the read pointer 510 and the write pointer 511 to detect the full status and empty status of the FIFO buffer 101, and prefetches instructions from the cache memory unit 6, so that the FIFO buffer 101 always holds instructions. The control logic unit 518 controls the prefetch pointer 512 to output the instruction address 143 for prefetching. In synchronism with this output, the control logic unit 518 sends a request signal 121 for accessing an instruction to the cache memory 6. The control logic unit 518 then waits for a response from the cache memory unit 6 and causes the FIFO buffer 101 to store an instruction based on the value of the write pointer 511. And, each time the FIFO buffer 101 stores an instruction, the control logic unit 518 controls the prefetch pointer 512 and the write pointer 511 to be incremented by a write clock signal 517.

When receiving a command to fetch instructions by the signal 142 from the timing controller 141, the control logic unit 518 controls the FIFO buffer 101 to output an instruction on the basis of the value of the read pointer 510. And, each time the FIFO buffer 101 outputs an instruction, the control logic unit 518 controls the read pointer 510 to be incremented by a read clock signal 514.

The control logic unit 518 resets the read pointer 510 and write pointer 511 when the clearance blocking signal 132 is disabled and the foregoing initializing signal 516 is enabled (when the instruction execution order is changed by branch instructions, etc., and the branch by the program counter-relative branch instruction does not involve one-instruction skipping). And, the control logic unit 518 also presets the instruction address 120 in the prefetch pointer 512 at that time, enables the request signal 121, and operates to fetch an instruction at the instruction address 120 into the FIFO buffer 101 from the cache memory 6. As the FIFO buffer 101 is cleared by resetting the read pointer 510 and the write pointer 511, the decode logic unit 513 supplies the instruction fetched into the FIFO buffer to the instruction register 106 through the through path in accordance with the request signal 142 for fetching instructions as received from the timing controller 141. The prefetch operation is repeated appropriately thereafter.

When the clearance blocking signal 132 is enabled, namely, when the branch by the program counter-relative branch instruction involves one-instruction skipping, the AND gate 515 functions so as not to reset the read pointer 510 and write pointer 511 and not to preset the fetch pointer IP. In other words, it is blocked from clearing the FIFO buffer 101. At that moment, the control logic 518 receives the clearance blocking signal 132 to increment the read pointer RP. Thereafter, the control logic unit 518 operates to read out instructions from the FIFO buffer 101 in accordance with the request signal 142 for fetching instructions. And then, the control logic unit 518 increments the read pointer 510 for a next read-out, in the same manner as the usual read-out. Thereby, it is possible to skip one instruction and give the next instruction (branch target instruction) to the instruction register 106.

FIG. 5A illustrates an example showing what kinds of instructions are disposed at the respective addresses,—when the branch by the program counter-relative branch instruction involves one-instruction skipping, and FIG. 5B illustrates the operation timing in this case. The operation timing shown in FIG. 5B represents a case in which, as shown in FIG. 5A, there is a program counter-relative branch instruction at an address 102, for example, and the instruction involves one-instruction skipping in that the branch target by the program counter-relative branch instruction is address 106. In FIG. 5A and 5B, when the program counter-relative branch instruction at the address 102 is being executed, the instructions at the next address 104 are already prefetched in the instruction prefetch buffer 31. At this moment, the instruction at address 102 is detected to be a program counter-relative branch instruction involving one-instruction skipping. Thereby, the instruction at the address 104 is skipped, and the instruction at the address 106, being the branch target designated by the instruction at the address 102, is executed next. Incidentally, the presentation in FIG. 5A and 5B is not consistent with the pipeline processing in some parts, which is intended for the reader to understand it easily.

In regard to the instruction shown in FIG. 5A, a conditional branch instruction shown in FIG. 6 is listed as one example. In FIG. 6, "cmp/gt r1, r2" is a comparison instruction to put the T-bit into the set status, if r1 (register value)>r2 (register value) is met. This corresponds to the instruction at an address 100 in FIG. 5A. "bt label" is a branch instruction to branch to label, if the T-bit is true (in the set status). This branch instruction corresponds to the instruction at the address 102 in FIG. 5A and contains the relative addressing mode, and the branch displacement involves one-instruction skipping. Accordingly, the description "label" corresponds to the instruction et the address 106. "add #4, r3" is an addition instruction to add the literal value 4 of r3 (register value) to write back to the register r3. This instruction is one example of the instruction at the address 104 in FIG. 5A.

Figures 7, 8:
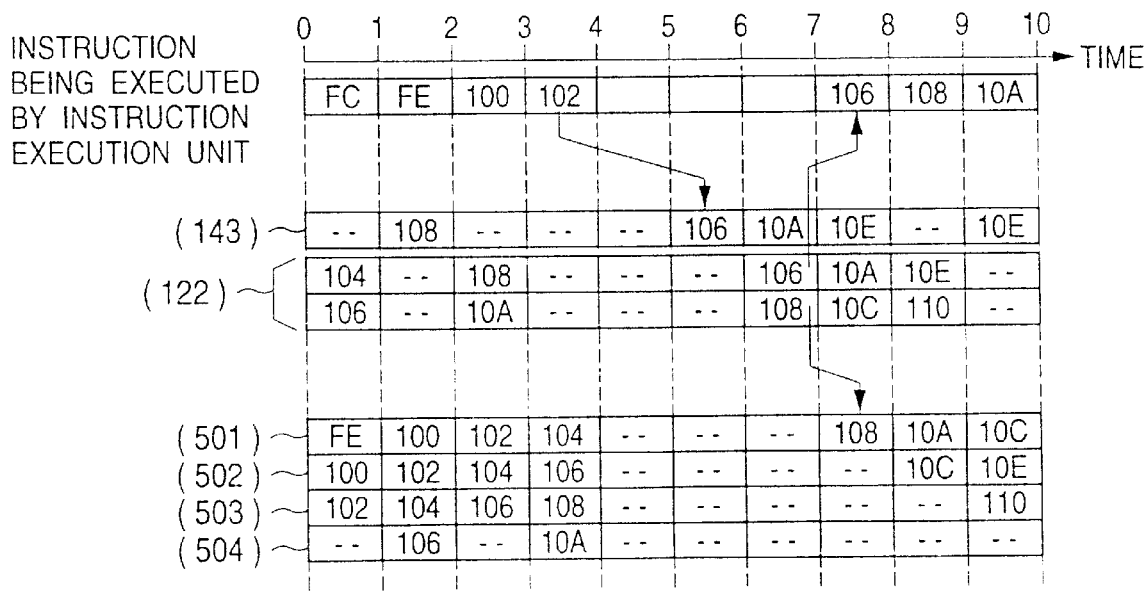
FIG. 7 is a chart schematically showing the instruction processing in FIG. 6 in accordance with pipeline processing.
FIG. 8 is a timing chart when a FIFO buffer is cleared, in case of a program counter-relative branch instruction involving one-instruction skipping as an example in comparison to FIG. 5.

The instruction processing in FIG. 6 will be described in accordance with the pipeline processing in FIG. 7. As shown in FIG. 7, at the decode stage D of the conditional branch instruction "bt", the execution result obtained at the execution stage E of the comparison instruction "com" is bypassed and referred to, and thereat the T-bit is judged. In accordance with the judgment result, the addition instruction "add" is determined to be or not to be executed. In this case, non-operation NOP (or, stall) is set in the pipeline next to the conditional branch instruction "bt", for easier understanding. Next, in accordance with the judgment of the foregoing condition, a branch target instruction is fetched. At this moment, as shown in FIG. 5B, the instruction prefetch buffer 31 is not cleared, and the branch target instruction is fetched from the instruction prefetch buffer 31 to the instruction register 106. Therefore, it is possible to execute the branch target instruction (next inst) at a high speed without producing disturbances in the pipeline due to an external memory access resulting from the fact that the cache memory unit 6 has an access miss or a cache miss.

FIG. 8 illustrates an example of the timing in case of clearing the FIFO buffer as a comparison example of FIG. 5B, in the same manner as the case of the program counter-relative branch instruction of one-instruction skipping and the other branch instructions. Suppose that the same instruction as shown in FIG. 5A is executed. In this case, if the instruction is a program counter-relative branch instruction, the FIFO buffer 101 will be cleared. Consequently, the instruction at the address 106 has to be fetched from the cache memory unit 6, and thereby the execution of the branch target instruction will be delayed compared to the case in FIG. 5.

Figures 9A, 9B:
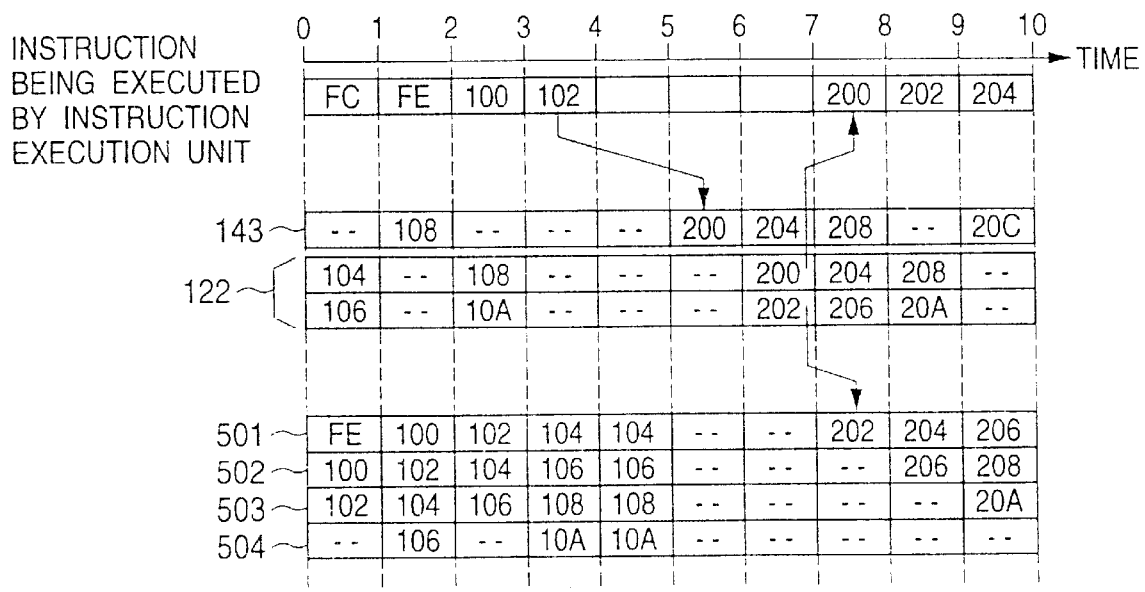
FIG. 9A is a chart illustrating what kind of instructions are located at respective addresses, in case of a branch instruction not involving one-instruction skipping.
FIG. 9B is an operational timing chart in case of a branch instruction not involving one-instruction skipping) and FIG. 10 is a block diagram illustrating one example of a data processing system in which the data processor of the present invention is employed.

FIG. 9A is a chart for explaining what kinds of instructions are disposed at the respective addresses, in case of a branch instruction not involving one-instruction skipping, and FIG. 9B illustrates the operation timing in this case. The operation timing shown in FIG. 9B is for a case in which, as shown in FIG. 9A, there is a branch instruction at the address 102, for example, and a branch target by the branch instruction is an address 200. In FIG. 9B, when the branch instruction at the address 102 is being executed, the instructions after the next address 104 are already prefetched in the instruction prefetch buffer 31. At this moment, the instruction is detected as not being a program counter-relative branch instruction involving one-instruction skipping. Thereby, the branch target address is calculated, and the FIFO buffer 101 is cleared. In this case, it is not possible to execute the instruction at the address 200 until the branch target instruction at the address 200 is fetched from the cache memory unit 6.

Figure 10:
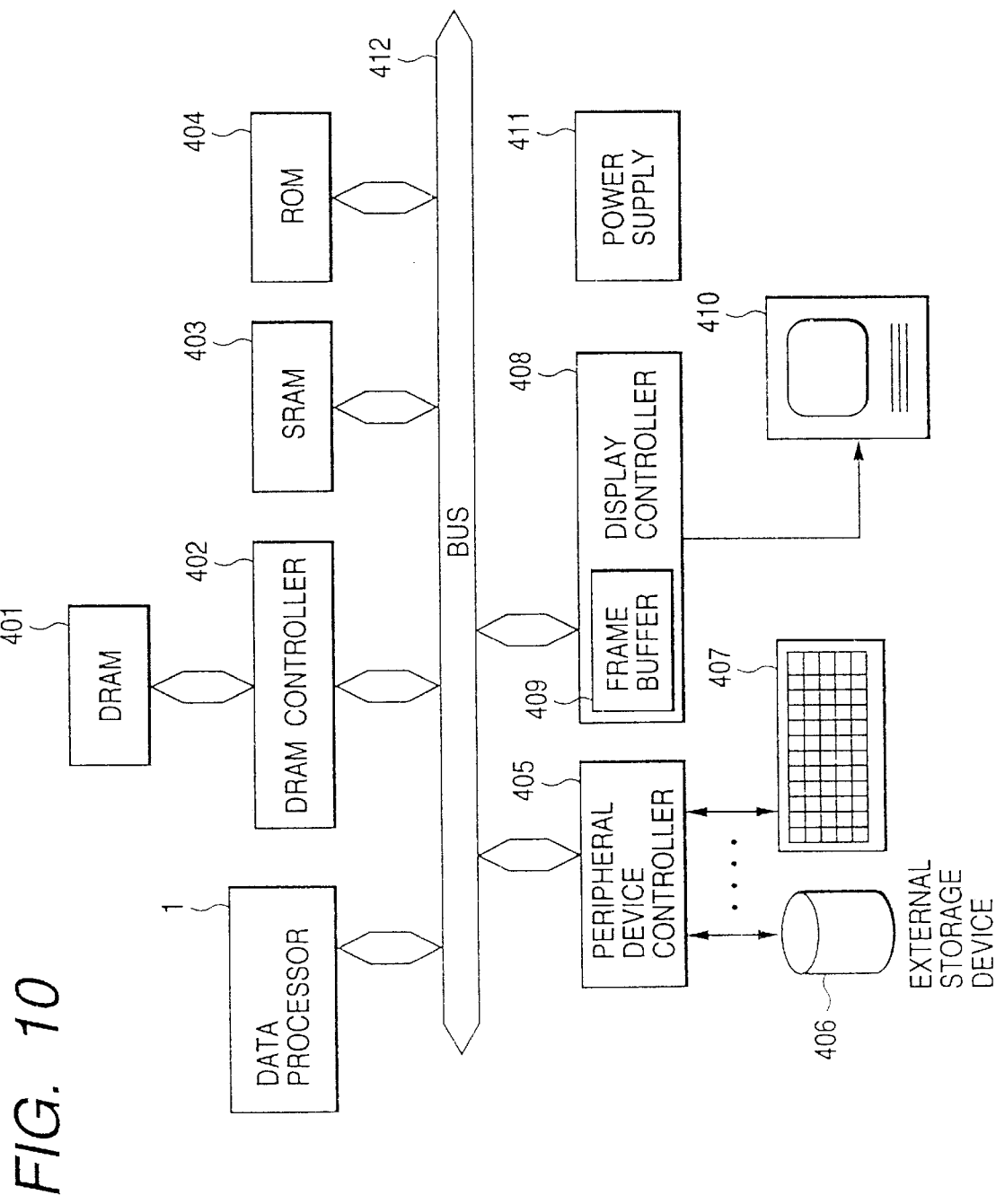

FIG. 10 illustrates a block diagram of a data processing system in which the foregoing data processor is applied.

FIG. 10 illustrates the data processing system as including the foregoing data processor 1, a dynamic random access memory (DRAM) 401, a DRAM controller 402 for executing the address multiplex control and the refresh control over the DRAM 401, and a SRAM 403. The SRAM 403 serves as a working area of the data processor 1 or a temporary storage area for data. A ROM 404 holds the operating system (OS) for the data processor 1. A peripheral device controller 405 is provided, to which are connected an external storage device 406 and a key board 407 representatively illustrated. A display controller 408 is provided with a frame buffer 409 and a plotting and display control logic unit, which are not illustrated. The display controller executes plotting and displaying control over a display 410. A power supply unit 411, and a bus 412 are provided as representatively illustrated.

The external memory, such as the foregoing S RAM 403 and DRAM 401, and the external storage device 406 connected to the peripheral device controller 405 as an external input-output unit, etc. are the targets for cache operation by the foregoing data cache unit 7. The ROM 404 as an external memory is a target for cache operation by the instruction cache unit 6. The data processor 1 accesses the foregoing SRAM 403, DRAM 401, external storage device 406 through the peripheral device controller 405, and ROM 404 in accordance with a bus cycle started by the bus controller 9.

In the data processor 1 thus described, the branch displacement information provided by the displacement (disp) is extracted by the branch displacement decoder 107 and is used for calculating the branch target address. The detection as to whether or not the branch target is within a specific range from the program counter-relative branch instruction can be acquired from the invalidation blocking determination logic unit 111 before completing calculation of the branch target address by the address calculation unit 112. If the detection result indicates a specific value, for example, a value corresponding to one-instruction skipping, the instruction prefetch buffer 31 is not given an instruction to be cleared; and if the detection result does not indicate the foregoing specific value, the instruction prefetch buffer 31 is given an instruction to be cleared. Therefore, the instruction prefetch buffer 31 is able to be controlled according to whether the instruction is to be cleared or not to be cleared, before the branch target address is produced, or before the branch target memory address is supplied. Thereby, the instruction prefetch buffer 31 is able to immediately output the branch target instruction out of the instructions already prefetched, if the detection result by the foregoing invalidation blocking determination logic unit 111 indicates the specific value. Further, even if the foregoing detection result does not indicate the specific value, the instruction prefetch buffer 31 will immediately fetch the instruction from the cache memory to output it, upon receiving the branch target address 120. Here, the speed will further increase if the instruction prefetch buffer 31 uses the through path.

Therefore, according to the above-described data processor 1, one-instruction skipping using a conditional branch by a program counter-relative instruction can be realized without clearing the instruction prefetch buffer. This is functionally the same as one-instruction skipping using a nullifying bit in the instruction code. However, it does not use instruction bits for a specific use such as the nullifying bit that will substantially restrict the available functions of the instructions. Thereby, in a data processor having an architecture formed of a small number of instruction bits, such as the 16-bit fixed length, the speed of executing conditional instructions using a branch instruction can be increased without restricting the function or the type of instructions.

The invention has been described concretely based on an embodiment, however, the invention is not limited to this, and it is natural that various modifications and changes are possible within the scope and spirit of the invention.

For instance, the invention is not limited to one-instruction skipping, since it can be applied to a plural instruction skipping as well. Further, the number of skips available is not limited to one type, since the prefetch buffer memory may be controlled so as to determine the number of skips by using the branch displacement information. In the foregoing example, the displacement=1 (meaning the next instruction) in the program counter-relative branch instruction is ignored, since such an application mode is usually impossible, or prohibited, and it is substantially meaningless. However, in the program counter-relative branch, for example, in case of an architecture that requires addition of a constant (for example, +2) as well as the displacement to the value of the program counter, when two types of instruction skipping, are desired optionally, the following arrangement is possible. In FIG. 3, although not illustrated, disp (0) is replaced by a logical product of the inverted signal of disp (0) and the noninverted signal of disp (1), and disp (1) is replaced by a logical product of the noninverted signal of disp (0) and the inverted signal of disp (1) and these values are supplied to the foregoing AND gate 702. Thereby, the invalidation blocking signal can be enabled in both cases where the displacement=0 and 1. In this case, the foregoing branch displacement signal 134 needs to be supplied also to the control logic unit 518, and in accordance with this, the control logic unit 518 has to control the skip number to be read out to the FIFO buffer 101.

In the embodiment, the invention is assumed to be applied to a branch instruction that branches into an address obtained by adding the value of the program counter and the value of the displacement field written into an instruction word. However, the invention can be applied also to a branch instruction having an arbitrary mode of branching other than the foregoing. One example is a branch instruction which branches into an address obtained by adding the value of the program counter and the value of a register of the CPU. Another example is a branch instruction which branches into an address obtained by adding the value of a register of the CPU and a constant. Another example is a branch instruction which branches into an address directly written into an instruction word. As to the three types of branch instructions additionally mentioned above, whether or not the branch displacement is a specific value can be determined as follows. As to the branch instruction which branches into an address obtained by adding the value of the program counter and the value of a register of the CPU, it can be determined by inspecting whether the value of the register of the concerned CPU is within a specific value or not. As to the other two branch instructions, it can be determined by, after generating a branch target address, subtracting the address of the branch instruction itself from the branch target address and inspecting whether the result of subtraction is within a specific value or not.

However, it should be noted that these examples need a determination time which is longer than the above-described embodiment. In the case of a branch instruction which branches into an address obtained by adding the value of the program counter and the value of the displacement field written into an instruction word, to simply input the instruction word suffices for the logic determination. On the other hand, in the case of a branch instruction which branches into an address obtained by adding the value of the program counter and the value of a register of the CPU, the logic determination needs time to read out the value of the register of the CPU and time to determine the logic by using the value of the register read out as an input. Further, in regard to the other two branch instructions, the logic determination needs time to generate a branch target address, time to subtract the address of the branch instruction itself from the branch target address, and time to determine the logic by using the subtraction result as an input.

Accordingly, in order to achieve branch control at the highest speed, preferably the invention is applied only to a branch instruction which branches into an address obtained by adding the value of the program counter and the value of the displacement field written into an instruction word.

Further, the type of branch instruction that is effective when it is applied to the invention is not limited to a program counter-relative branch instruction. In short, it is only necessary for the concerned branch instruction itself to hold information, such as branch displacement information, having a constant relation with the displacement from the concerned branch instruction.

The data processor relating to the invention is not limited to application to a so-called embedded control unit, and it is naturally applicable to a data processor for use as a general purpose computer. Further, the architecture of the data processor is not at all limited to RISC or superscalar processor.

While the invention thus disclosed produces various effects, some of the typical ones are as follows.

It is possible to supply a branch target instruction of a specific displacement to the CPU at a high speed from the instruction prefetch buffer, without adding a special bit as a nullifying bit to the instruction code. Further, it is possible to realize one-instruction skipping using a conditional branch without clearing the instruction prefetch buffer. This is functionally the same as one-instruction skipping using the nullifying bit of an instruction code, however, it does not use instruction bits as specific bit for nullifying that substantially restricts the available functions of instructions. Therefore, in a data processor having an architecture formed of a small number of instruction bits, such as a 16-bit fixed length, the speed of executing conditional instructions using a branch instruction can be increased without restricting the function or the type of instructions.

The invention having been thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data processor comprising a CPU and an instruction prefetch buffer that prefetches an instruction executed by the CPU and stores it therein, wherein:

the CPU contains detection means for detecting whether or not a displacement from a branch instruction to a branch target instruction is a specific displacement on the basis of information that the concerned branch instruction holds; and the instruction prefetch buffer clears an instruction already prefetched when the detection means detects that the displacement is not the specific displacement and outputs a branch target instruction newly fetched to the CPU, and outputs a branch target instruction already prefetched to the CPU when the detection means detects that the displacement is the specific displacement.

2. A data processor as claimed in claim 1, wherein the information that the branch instruction holds is information of a displacement field contained in a branch instruction word.

3. A data processor comprising a CPU and an instruction prefetch buffer that prefetches an instruction executed by the CPU and stores it therein, wherein:

the CPU contains detection means for detecting whether or not a branch displacement information of a branch instruction containing the branch displacement information for determining an address displacement to a branch target indicates a specific value; and the instruction prefetch buffer clears an instruction already prefetched when the detection means detects that the branch displacement information does not indicate the specific value and outputs a branch target instruction newly fetched to the CPU, and outputs a branch target instruction already prefetched to the CPU when the detection means detects that the branch displacement information indicates the specific value.

4. A data processor comprising a CPU, prefetch control means that controls prefetching of an instruction executed by the CPU, and a buffer memory for storing a prefetched instruction; wherein:

the CPU contains detection means for detecting whether or not branch displacement information contained in a branch instruction for determining an address displacement to a branch target indicates a specific value; and the prefetch control means clears an instruction already prefetched in the buffer memory when the detection means detects that the branch displacement information does not indicate the specific value and newly fetches a branch target instruction into the buffer memory and outputs to the CPU, and outputs a branch target instruction already prefetched in the buffer memory to the CPU when the detection means detects that the branch displacement information indicates the specific value.

5. A data processor comprising a CPU, prefetch control means that controls prefetching of an instruction executed by the CPU, and a buffer memory for storing a prefetched instruction, wherein:

the CPU comprises: a program counter, instruction decode means for decoding an instruction fetched from the instruction prefetch buffer on the basis of a value of the program counter, detection means for detecting whether or not a decoded result by the instruction decode means is a program counter-relative branch instruction and whether or not a value indicated by branch displacement information contained in a branch instruction is a specific value, and address operation means for producing a branch target address on the basis of the branch displacement information; and the prefetch control means clears an instruction already prefetched in the buffer memory when the detection means detects that the decoded result by the instruction decode means is an instruction other than the program counter-relative branch instruction or the branch displacement information does not indicate the specific value and newly fetches a branch target instruction on the basis of an instruction address operated by the address operation means and outputs to the CPU, and selects the branch target instruction corresponding to the instruction address operated by the address operation means out of instructions already prefetched in the buffer memory and outputs it to the CPU when the detection means detects that the decoded result by the instruction decode means indicates a program counter-relative branch instruction and the branch displacement information indicates the specific value.

6. A data processor as claimed in any one of claim 3 through 5, wherein the specific value of the branch displacement information detected by the detection means is a value to skip one instruction next to the concerned branch instruction.

7. A data processor as claimed in any one of claim 1, 3 through 5, wherein an instruction set executed by the CPU is of a 16-bit fixed length.

8. A data processor as claimed in claim 7, wherein the data processor further comprises an instruction cache memory, and wherein said instruction prefetch buffer inputs instructions from the instruction cache memory.

9. A data processor as claimed in claim 8, wherein the data processor further comprises a bus controller and is formed into one semiconductor chip, and the bus controller controls the start of an external bus cycle whereby the instruction cache memory takes in a cache entry from the outside of the semiconductor chip.

10. A data processing system comprising the data processor set forth in claim 9, and further including an external memory that the data processor accesses through the bus controller and an external input output circuit in which the data processor accesses through the bus controller.

11. A data processor comprising a CPU and an instruction prefetch buffer for prefetching an instruction executed by the CPU, wherein:

the CPU contains a detection circuit for detecting a displacement from a branch instruction to a branch target instruction; and the instruction prefetch buffer clears an instruction already prefetched when the displacement does not indicate a specific value and outputs a branch target instruction newly fetched to the CPU, and outputs a branch target instruction already prefetched to the CPU when the displacement indicates the specific value.

12. A data processor comprising a CPU, a prefetch buffer for an instruction executed by the CPU, wherein:

the CPU comprises: a program counter, an instruction decoder for decoding an instruction fetched from the instruction prefetch buffer on the basis of a value of the program counter, and a detection circuit for detecting whether or not a decoded result by the instruction decoder indicates a program counter-relative branch instruction and whether or not a value indicated by a branch displacement information contained in a branch instruction is a specific value; and the prefetch buffer clears an instruction already prefetched when the detection circuit detects that a decoded result by the instruction decoder is an instruction other than the program counter-relative branch instruction or the branch displacement information does not indicate the specific value and outputs a newly fetched branch target instruction to the CPU, and outputs a branch target instruction already prefetched to the CPU when the detection circuit detects that the decoded result by the instruction decoder is the program counter-relative branch instruction and the branch displacement information indicates the specific value.

* * * * *